(12) United States Patent
Chen et al.

(10) Patent No.: US 9,010,210 B2
(45) Date of Patent: Apr. 21, 2015

(54) INTERNAL CIRCULATION BALL SCREW

(75) Inventors: Yan-Yu Chen, Taichung (TW);
Yung-Hsueh Lin, Taichung (TW)

(73) Assignee: Hiwin Technololgies Corp., Taichung (TW)

( * ) Notice: Subject to any disclaimer, the term of this patent is extended or adjusted under 35 U.S.C. 154(b) by 421 days.

(21) Appl. No.: 13/341,691

(22) Filed: Dec. 30, 2011

(65) Prior Publication Data

US 2013/0133453 A1    May 30, 2013

(51) Int. Cl.
*F16H 25/22*    (2006.01)

(52) U.S. Cl.
CPC ....... *F16H 25/2223* (2013.01); *Y10T 74/19767* (2015.01); *F16H 25/2219* (2013.01)

(58) Field of Classification Search
CPC ............ F16H 25/2214; F16H 25/2204; F16H 25/2219; F16H 25/22; F16H 25/2223
USPC ............... 74/424.86, 424.87, 424.84, 424.83, 74/424.82, 424.81
See application file for complete search history.

(56) References Cited

U.S. PATENT DOCUMENTS

| | | | | |
|---|---|---|---|---|
| 2,851,897 | A * | 9/1958 | Cochrane | 74/424.87 |
| 3,261,224 | A * | 7/1966 | Anthony | 74/424.86 |
| 3,301,082 | A * | 1/1967 | Kosinski | 74/424.87 |
| 3,327,551 | A * | 6/1967 | Prueter | 74/424.87 |
| 4,186,621 | A * | 2/1980 | Brusasco | 74/424.83 |
| 4,364,282 | A * | 12/1982 | Nilsson | 74/424.82 |
| 4,841,796 | A * | 6/1989 | Teramachi | 74/424.86 |
| 4,945,781 | A * | 8/1990 | Isert | 74/424.94 |
| 5,193,409 | A * | 3/1993 | Babinski | 74/424.83 |
| 5,388,475 | A * | 2/1995 | Shear et al. | 74/424.86 |
| 5,711,188 | A * | 1/1998 | Miyaguchi et al. | 74/424.87 |
| 6,439,338 | B2 * | 8/2002 | Yoshioka et al. | 180/444 |
| 6,454,042 | B1 * | 9/2002 | Yoshida et al. | 180/444 |
| 6,668,672 | B2 * | 12/2003 | Kuo et al. | 74/424.82 |
| 6,813,969 | B2 * | 11/2004 | Huang | 74/424.83 |
| 7,487,692 | B2 * | 2/2009 | Lin et al. | 74/424.86 |
| 7,908,938 | B2 * | 3/2011 | Chen | 74/424.82 |
| 8,132,479 | B2 * | 3/2012 | Niwa et al. | 74/424.87 |
| 8,146,453 | B2 * | 4/2012 | Uesugi et al. | 74/424.82 |
| 8,220,353 | B2 * | 7/2012 | Teramachi et al. | 74/424.86 |
| 2003/0192388 | A1 * | 10/2003 | Nagai et al. | 74/89.44 |
| 2004/0083841 | A1 * | 5/2004 | Kuo et al. | 74/424.86 |
| 2004/0237685 | A1 * | 12/2004 | Inoue et al. | 74/424.83 |
| 2004/0237686 | A1 * | 12/2004 | Watanabe | 74/424.86 |
| 2005/0061098 | A1 * | 3/2005 | Huang | 74/424.83 |
| 2005/0217401 | A1 * | 10/2005 | Osterlanger et al. | 74/424.87 |
| 2007/0000342 | A1 * | 1/2007 | Kazuno | 74/424.83 |

(Continued)

*Primary Examiner* — Justin Krause
*Assistant Examiner* — Gregory Prather
(74) *Attorney, Agent, or Firm* — Muncy, Geissler, Olds & Lowe, P.C.

(57) ABSTRACT

An internal circulation ball screw includes a threaded shaft, a nut having a receiving space, a circulation member mounted to the receiving space and having a first circulation groove and a second circulation groove, and a plurality of rolling members running between the threaded shaft and the nut. The first circulation groove defines a first front section, a first rear section, and a first curved section communicating with the first front section and the first rear section separately. The second circulation groove defines a second front section, a second rear section, and a second curved section communicating with the second front section and the second rear section separately. The first and second curved sections define a predetermined included angle with respect to the threaded shaft radially. Therefore, the wall between the circulation channels is uniform to enhance the durability of the ball screw.

9 Claims, 9 Drawing Sheets

(56) References Cited

U.S. PATENT DOCUMENTS

| | | | |
|---|---|---|---|
| 2007/0240532 A1* | 10/2007 | Osterlanger et al. | 74/424.87 |
| 2007/0295132 A1* | 12/2007 | Lin et al. | 74/424.86 |
| 2009/0064811 A1* | 3/2009 | Shirai | 74/424.87 |
| 2010/0031763 A1* | 2/2010 | Kuo | 74/424.86 |
| 2010/0050801 A1* | 3/2010 | Kuo | 74/424.87 |
| 2011/0167940 A1* | 7/2011 | Shavrnoch et al. | 74/89.36 |
| 2012/0192667 A1* | 8/2012 | Chen et al. | 74/424.82 |
| 2013/0199324 A1* | 8/2013 | Piltz et al. | 74/424.86 |

* cited by examiner

INTERNAL CIRCULATION BALL SCREW

BACKGROUND OF THE INVENTION

1. Field of the Invention

The present invention relates generally to a ball screw, and more particularly, to an internal circulation ball screw.

2. Description of the Related Art

A generic ball screw includes two types—external circulation ball screw and internal circulation ball screw. In the external circulation ball screw, a guiding member is mounted to a nut for guiding circulative movement of rolling members. Generally speaking, the external circulation ball screw is applicable while the pitch is longer and the nut is bigger relatively. As for the internal circulation ball screw, a circulation member is additionally mounted inside the nut to allow circulative movement of the rolling members inside the nut, so the internal circulation ball screw is applicable while the pitch is shorter and the nut is smaller relatively.

The conventional internal circulation ball screw includes a circulation member, which is usually linearly arranged, as shown in FIGS. 1-2. However, the circulation member 1 having circulation channels 2 linearly arranged may have the following problem. As shown in FIG. 1, when the circulation member 1 works with a ball screw having shorter stroke, it is necessary to apply cross-thread design to the internal circulation ball screw to prevent the circulation member 1 from damage resulting from excessively thin walls of the circulation channels. However, the cross-thread design will result in that the nut is too long and the ineffective threads become more. In addition, the pitch between the adjacent circulation channels 4 provided by the circulation member 3 shown in FIG. 2 for the rolling members to cross the peak of the thread is too small and the walls of the circulation channels 4 are thin, so the circulation member 3 is subject to damage.

SUMMARY OF THE INVENTION

The primary objective of the present invention is to provide an internal circulation ball screw, the durability of which can be enhanced.

The foregoing objective of the present invention is attained by the internal circulation ball screw composed of a threaded shaft, a nut, a circulation member, and a plurality of rolling members. The threaded shaft includes a first threaded groove. The nut is sleeved onto the threaded shaft and includes a second threaded groove and a receiving space. The second threaded groove corresponds to and fits the first threaded groove. The receiving space has a first side and a second side. The second threaded groove intersects the receiving space in such a way that a first fracture and a third fracture are formed at the first side and a second fracture and a fourth fracture are formed at the second side. The circulation member is mounted to the receiving space and includes a first circulation groove and a second circulation groove. The first circulation groove defines a first front section, a first curved section, and a first rear section. The first front section communicates with the first fracture. The first curved section communicates with the first front section and the first rear section separately. The first rear section communicates with the second fracture. The second circulation groove defines a second front section, a second curved section, and a second rear section. The second front section communicates with the third fracture. The second curved section communicates with the second front section and the second rear section separately. The second rear section communicates with the fourth fracture. The first and second curved sections are arranged along the threaded shaft and define a predetermined included angle therebetween with respect to the threaded shaft radially. The rolling members can run among the first and second threaded grooves and the first and second circulation channels.

Therefore, the present invention can avoid applying the cross-thread design to the circulation member and the walls of the circulation channels are uniform.

DETAILED DESCRIPTION OF PREFERRED EMBODIMENTS

Figure 1:
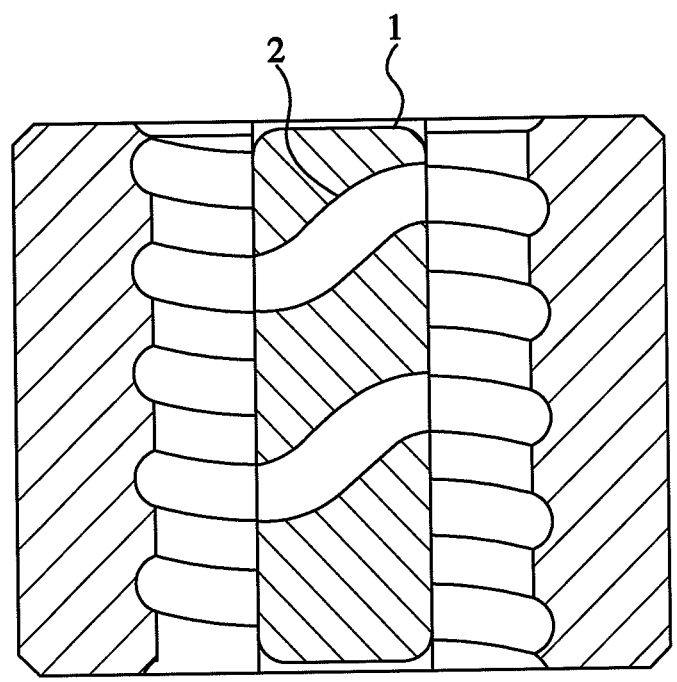
FIG. 1 is a schematic view of the prior art.
Figure 2:
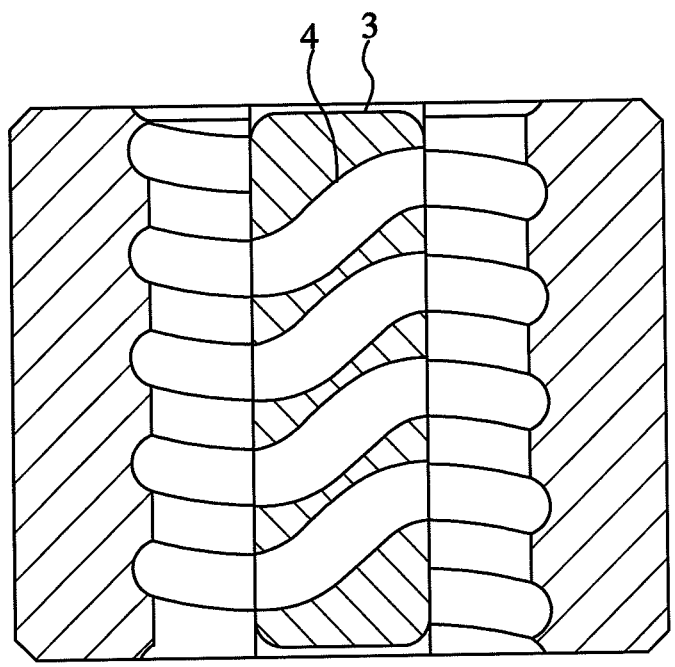
FIG. 2 is another schematic view of the prior art.
Figure 3:
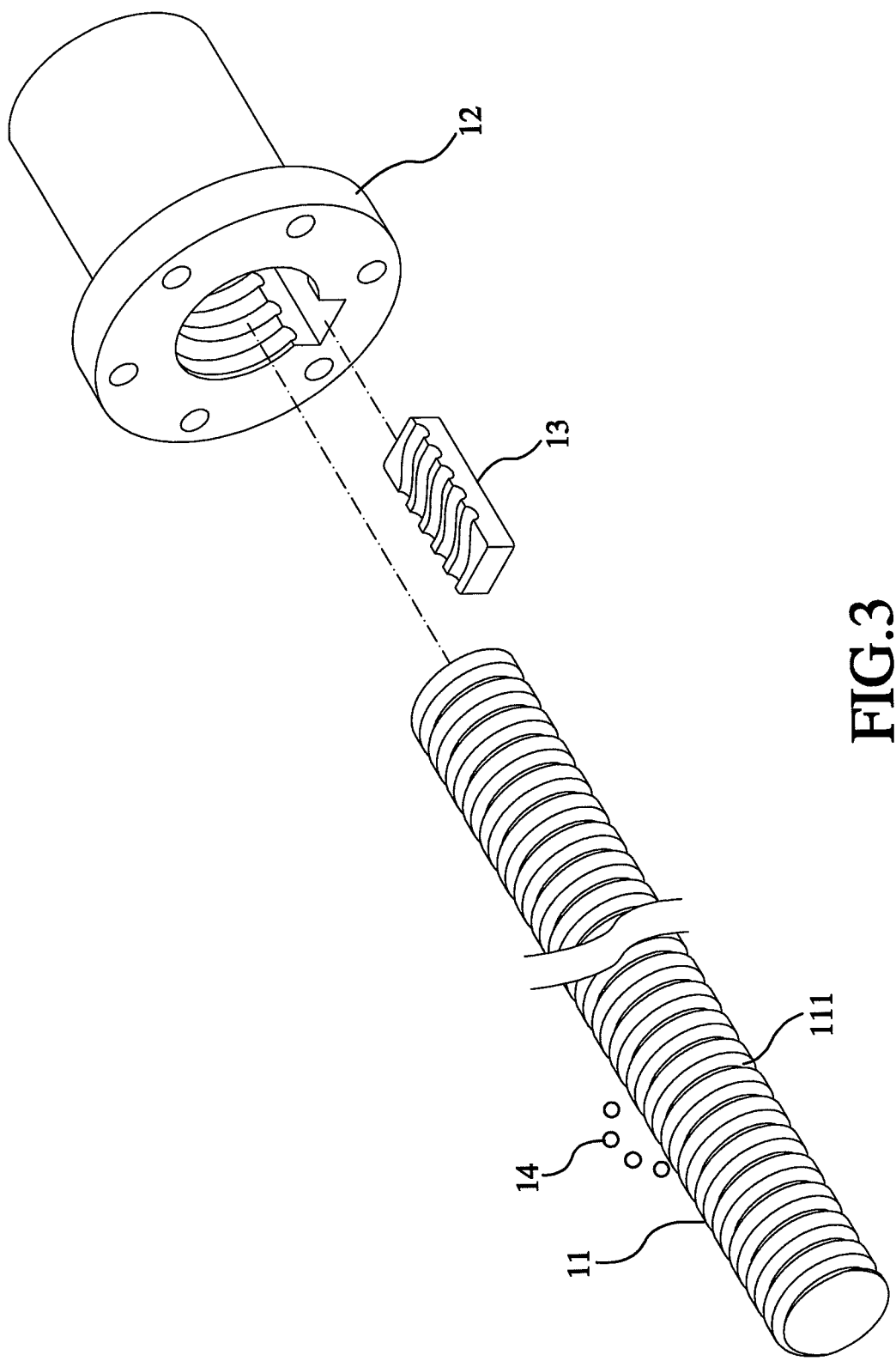
FIG. 3 is an exploded view of a first preferred embodiment of the present invention.
Figure 4:
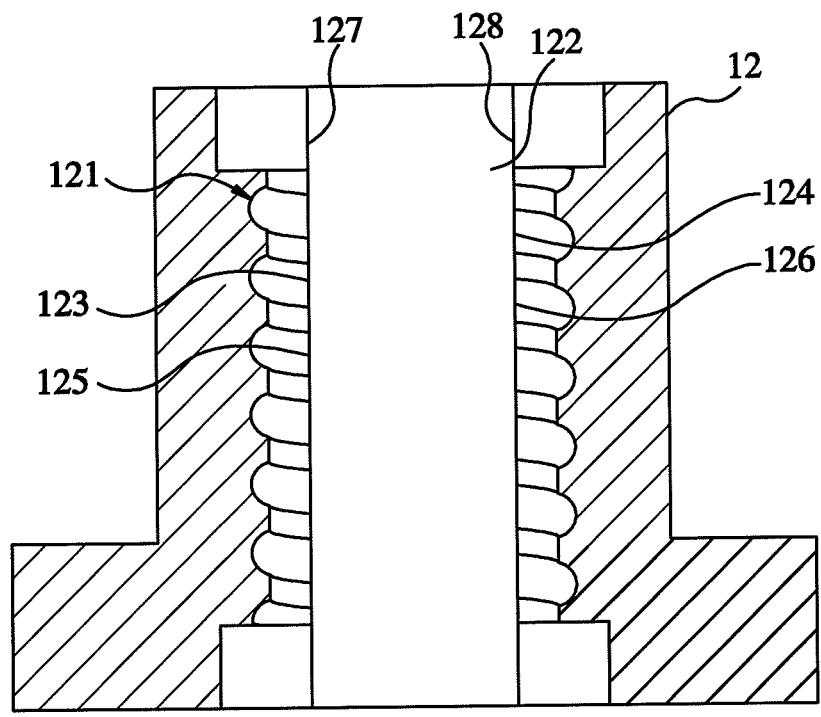
FIG. 4 is a sectional view of the nut in accordance with the first preferred embodiment of the present invention.
Figure 5:
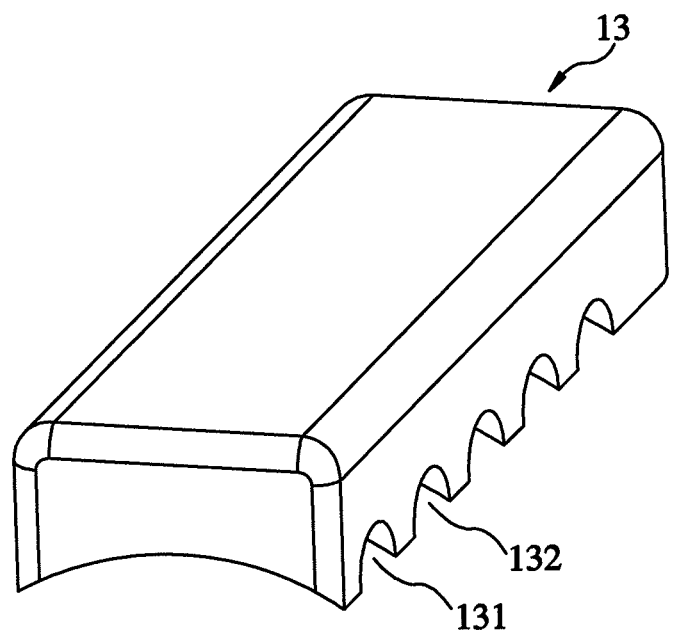
FIG. 5 is a perspective view of the circulation member in accordance with the first preferred embodiment of the present invention.
Figure 6:
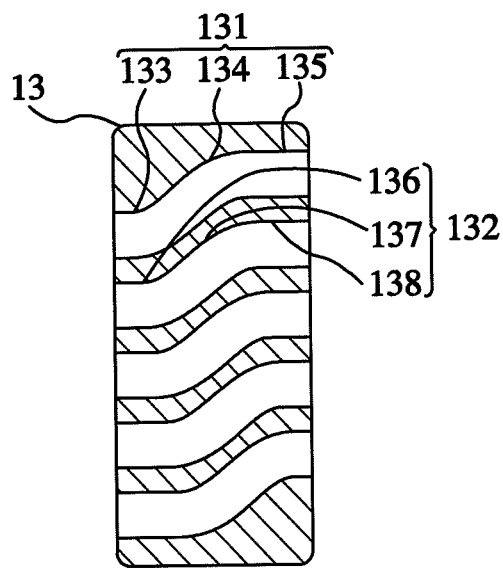
FIG. 6 is a front view of the circulation member in accordance with the first preferred embodiment of the present invention.
Figure 7:
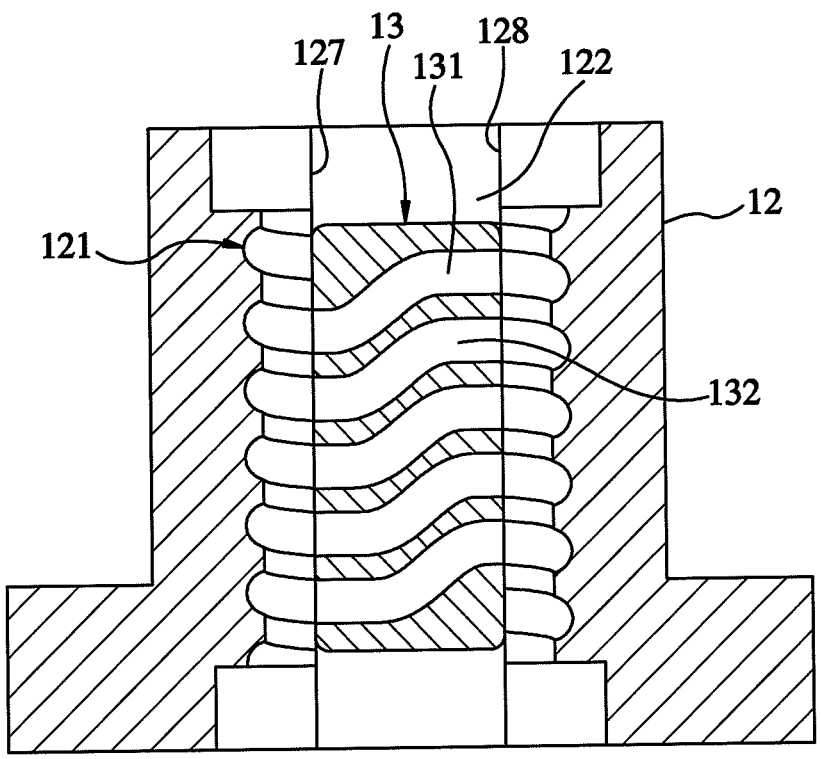
FIG. 7 is a sectional view of the first preferred embodiment of the present invention in assembly.

Referring to FIGS. 3-9, an internal circulation ball screw constructed according to a first preferred embodiment of the present invention is composed of a threaded shaft 11, a nut 12, a circulation member 13, and a plurality of rolling members 14. The detailed descriptions and operations of these elements as well as their interrelations are recited in the respective paragraphs as follows.

The threaded shaft 11 includes a first threaded groove 111 and an imaginary axis 112.

The nut is sleeved onto the threaded shaft 11 and includes a second threaded groove 121 and a receiving space 122. The second threaded groove 121 corresponds to and fits the first threaded groove 111. The receiving space 122 is provided with a first side 127 and a second side 128. The second threaded groove 121 intersects the receiving space 122 in such a way that a first fracture 123 and a third fracture 125 are formed at the first side 127 and a second fracture 124 and a fourth fracture 126 are formed at the second side 128.

The circulation member 13 is mounted to the receiving space 122 and includes a first circulation channel 131 and a second circulation channel 132. The first circulation channel 131 defines a first front section 133, a first curved section 134, and a first rear section 135. The first front section 133 communicates with the first fracture 123. The first curved section 134 communicates with the first front section 133 and the first rear section 134. The first rear section 135 communicates with the second fracture 124. The second circulation channel 132 defines a second front section 136, a second curved section 137, and a second rear section 138. The second front section 136 communicates with the third fracture 125. The second curved section 137 communicates with the second front section 136 and the second rear section 138 separately. The second rear section 138 communicates with the fourth fracture 126. The first and second curved sections 134 and 137 are arranged along the threaded shaft 11 and define a predetermined included angle α with respect to the imaginary axis 112 radially.

Figure 8:
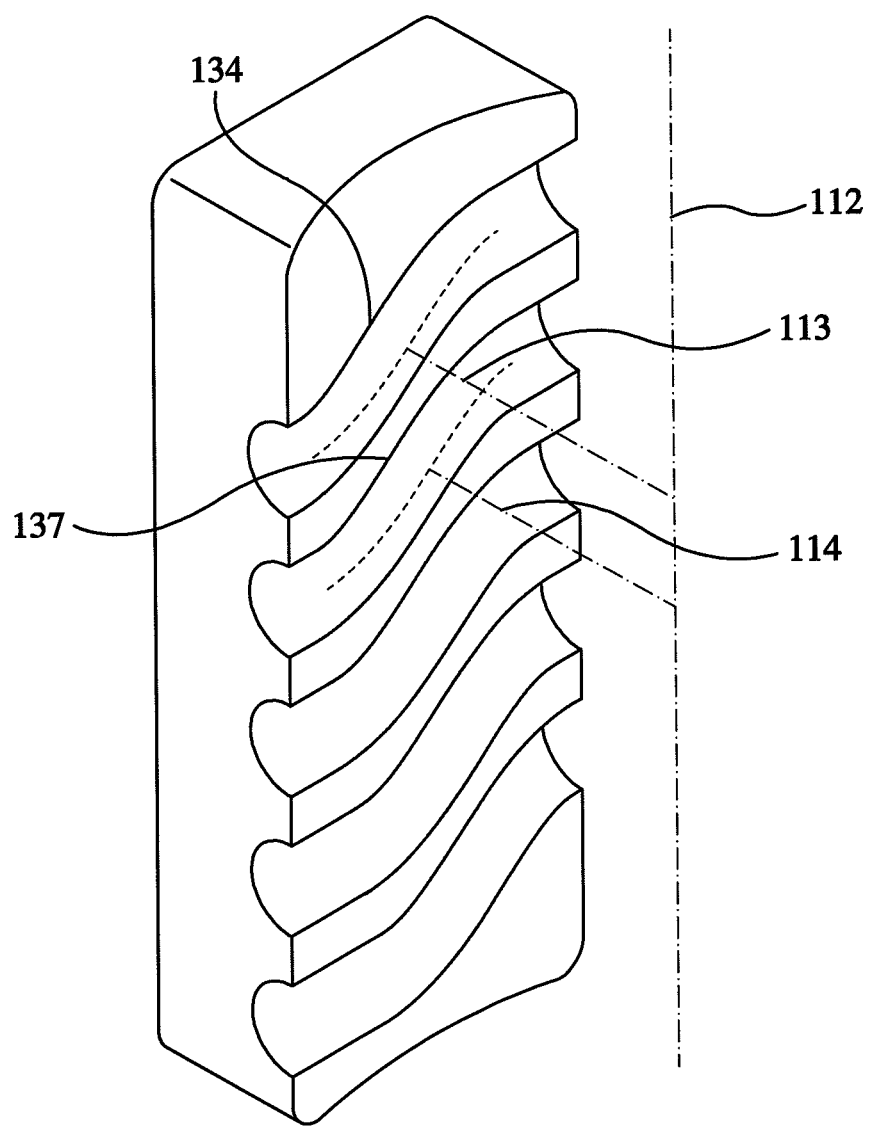
FIG. 8 is another perspective view of the circulation member in accordance with the first preferred embodiment of the present invention, illustrating the predetermined included angle defined between the first and second circulation channels.
Figure 9:
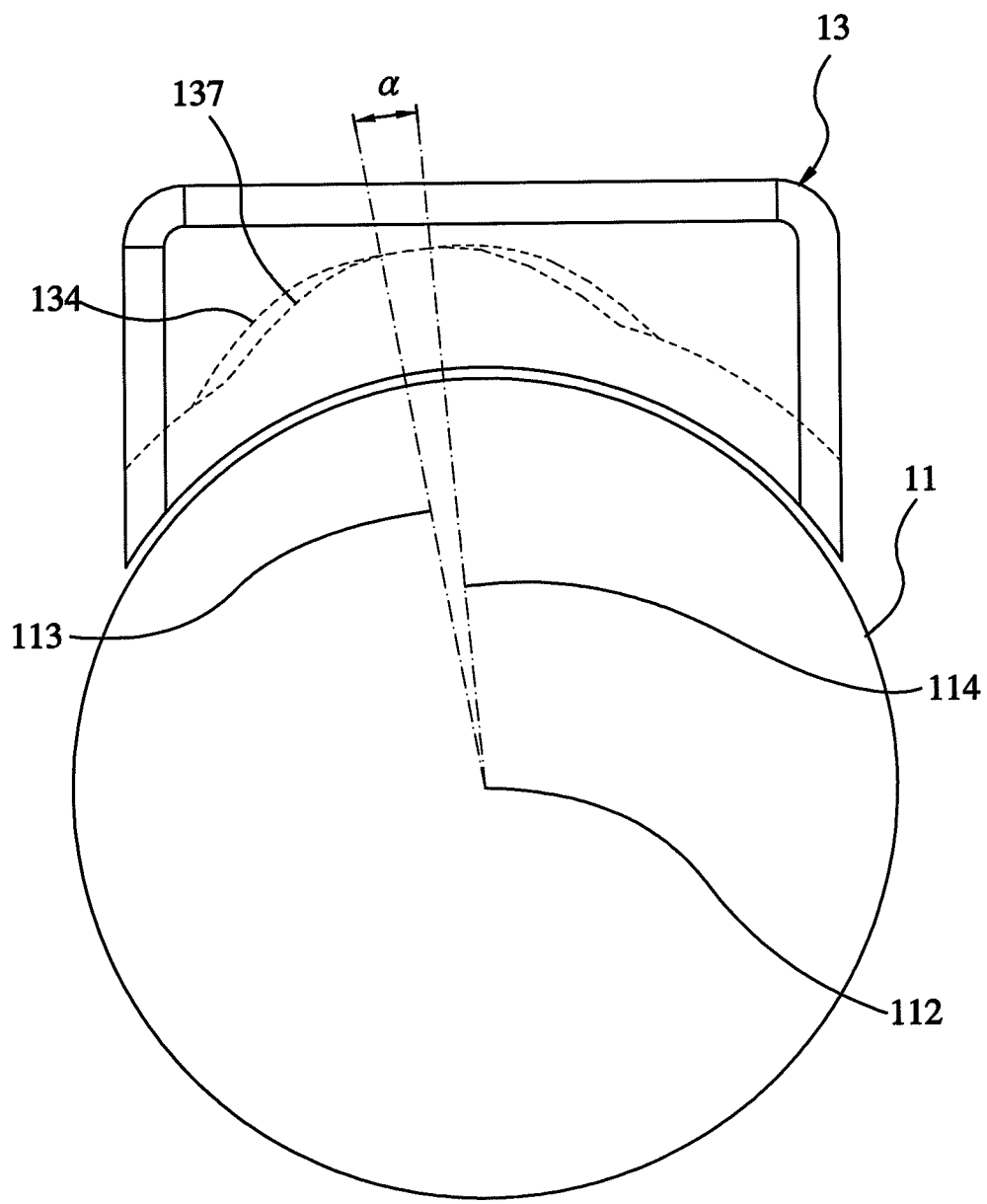
FIG. 9 is a side view of the circulation member in accordance with the first preferred embodiment of the present invention, illustrating the same as that of FIG. 8.

Please refer to FIGS. 8-9 for definite illustration of arrangement of the first and second curved sections 134 and 137. An imaginary first connection line 113 is connected with a center of the first curved section 134 and the imaginary axis 112. An imaginary second connection line 114 is connected with a center of the second curved section 137 and the imaginary axis 112. Toward the circulation member 13 along the imaginary axis 112, a user can observe that the imaginary first and second connection lines 113 and 114 define the predetermined included angle α therebetween and the first and second curved sections 134 and 137 define the predetermined included angle α therebetween with respect to the imaginary axis 112 radially. In this embodiment, the included angle α defined between the first and second curved sections 134 and 137 is an acute angle.

Each of the rolling members 14 runs among the first and second threaded grooves 111 and 121 and the first and second circulation channels 131 and 132.

Figure 10:
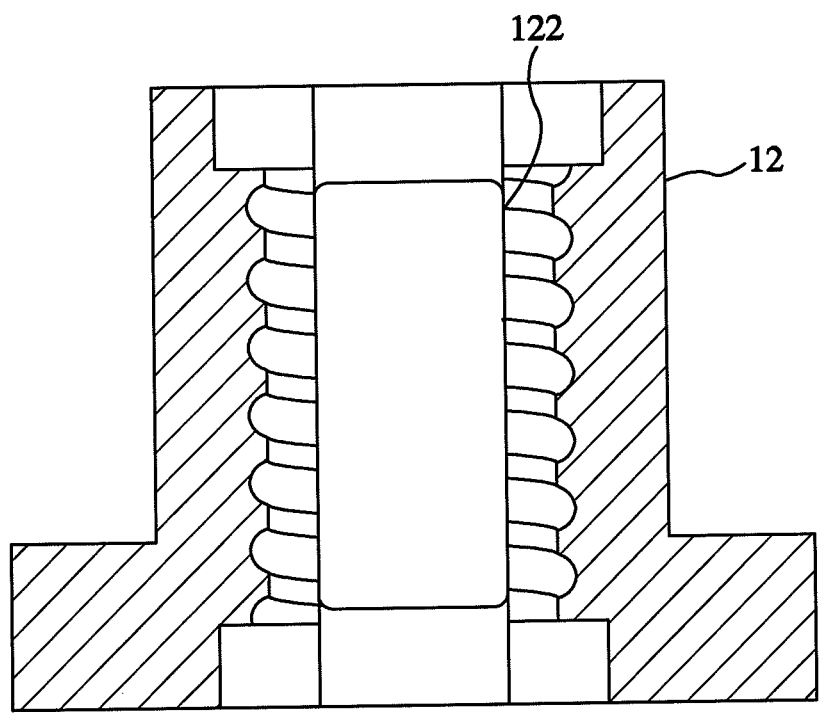
FIG. 10 is a sectional view of the nut in accordance with the first preferred embodiment of the present invention.

It is to be noted that the receiving space 122 communicates with one end of the nut 12 to enable the circulation member 13 to be conveniently mounted into the receiving space 122. However, as shown in FIGS. 9-10, the receiving space 122 can run through the nut 12 in such a way that the user can install the circulation member 13 into the nut 12 along the receiving space 122.

Figure 11:
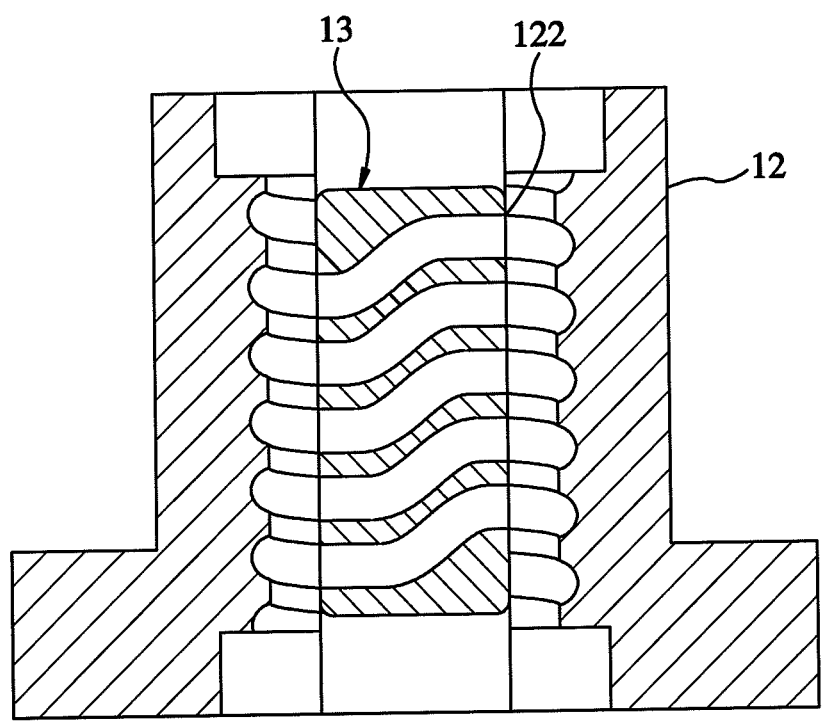
FIG. 11 is a sectional view of a second preferred embodiment of the present invention in assembly.
Figure 12:
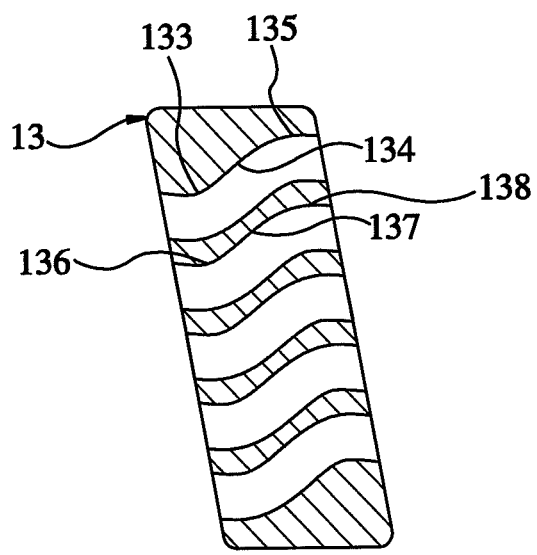
FIG. 12 is a front view of the second preferred embodiment of the present invention.
Figure 13:
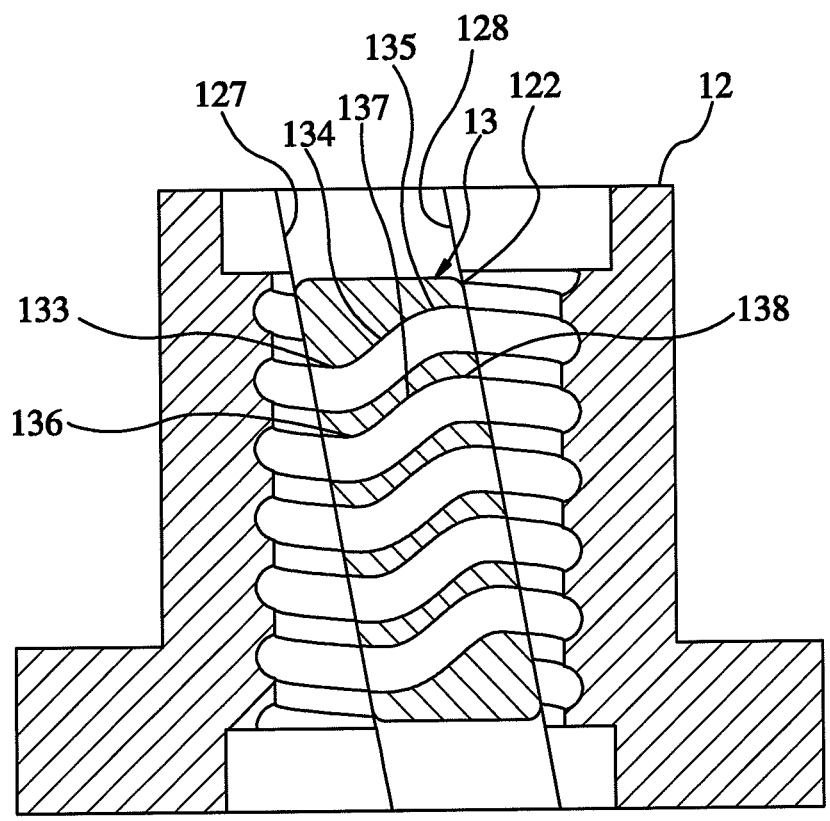
FIG. 13 is a sectional view of the second preferred embodiment of the present invention in assembly.
Figure 14:
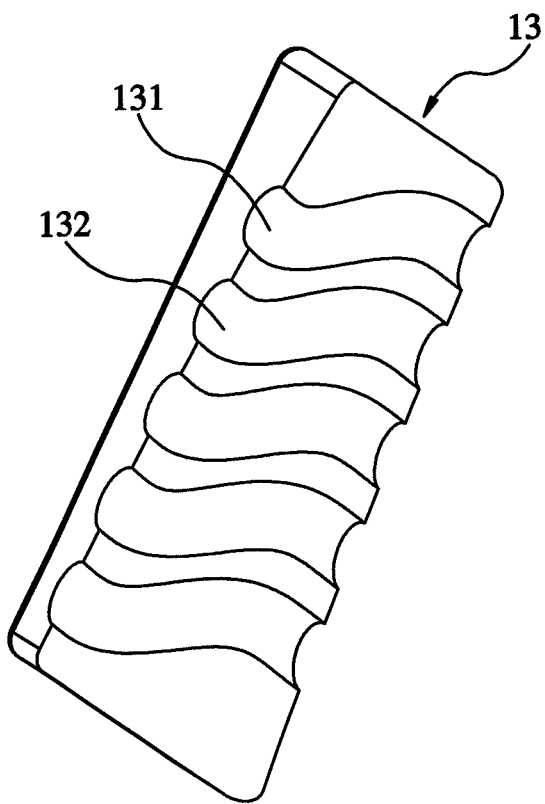
FIG. 14 is a schematic view of a part of the second preferred embodiment of the present invention.
Figure 15:
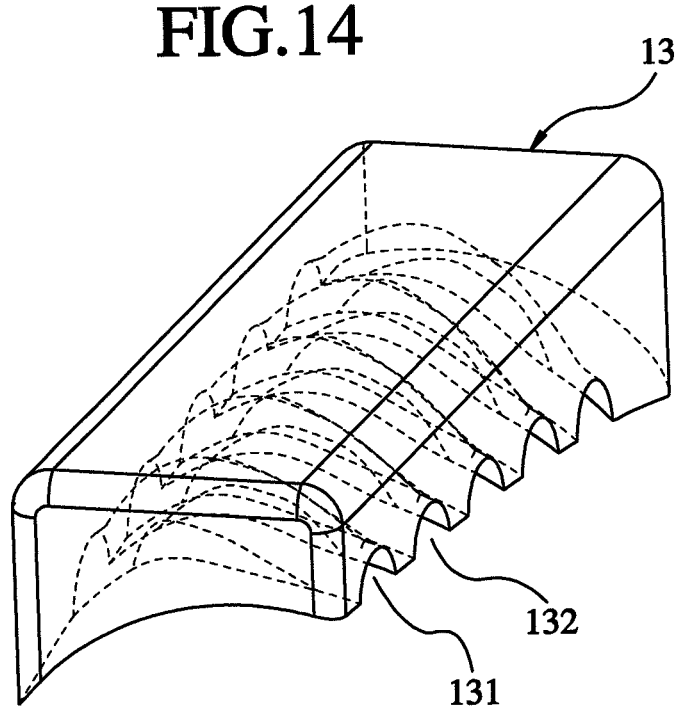
FIG. 15 is a perspective view of the second preferred embodiment of the present invention.

Next, referring to FIGS. 11-13, an internal circulation ball screw constructed according to a second preferred embodiment of the present invention is similar that of the first embodiment, having the following differences. The first front section 133 is as long as the second front section 136 to allow the lateral side of the circulation member 13 to follow the arrangement of the first and second curved sections 134 and 137 in such a way that the total area of the circulation member 13 is less than that of the first embodiment. Besides, the material of the circulation member 13 is less rigid than that of the nut 12, so the circulation member 13 cannot be loaded with any weight as the nut 12 can. Thus, the area of the internal side of the nut 12 that the circulation member 13 occupies is decreased to reduce the ineffective area of the internal side of the nut 12, where the circulation member 13 cannot be loaded with any weight, enhancing the durability of the internal circulation ball screw. In this embodiment, the first and second rear sections 135 and 138 have the same length; the circulation member 13 is elongated and in thickness, its diagonal corners are equal but its adjacent corners are not equal. Besides, the lateral side of the circulation member 13 and the imaginary axis 112 of the threaded shaft 11 are arranged off-center.

As known from above, the present invention includes the following advantages.

1. The first and second curved sections 134 and 137 of the circulation member 13 are arranged at the predetermined included angle α on the threaded shaft 11, so the wall between the first and second circulation channels 131 and 132 can be maintained to prevent the wall between the circulation channels linearly arranged from being excessively thin and avoid applying the cross-thread design to the circulation member.

2. The wall between the first and second circulation channels 131 and 132 is uniform to prevent the circulation member 13 from damage resulting from the excessively thin wall between the circulation channels in the prior art and to enhance the durability of the internal circulation ball screw.

Although the present invention has been described with respect to specific preferred embodiments thereof, it is in no way limited to the specifics of the illustrated structures but changes and modifications may be made within the scope of the appended claims.

What is claimed is:
1. An internal circulation ball screw comprising:
    a threaded shaft having a first threaded groove and an imaginary axis;
    a nut sleeved onto the threaded shaft and having a second threaded groove and a receiving space, the second threaded groove corresponding to and fitting the first threaded groove, the receiving space having a first side and a second side, the second threaded groove intersecting the receiving space to form a first fracture and a third fracture at the first side and form a second fracture and a fourth fracture at the second side;
    a circulation member mounted to the receiving space and having a first circulation channel and a second circulation channel, the first circulation channel defining a first front section, a first curved section, and a first rear section, the first front section communicating with the first fracture, the first curved section communicating with the first front section and the first rear section respectively, the first rear section communicating with the second fracture, the second circulation channel defining a second front section, a second curved section, and a second rear section, the second front section communicating with the third fracture, the second curved section communicating with the second front section and the second rear section respectively, the second rear section communicating with the fourth fracture, the first and second curved sections being arranged along the threaded shaft and defining a predetermined included angle therebetween with respect to the imaginary axis radially; and
    a plurality of rolling members running among the first and second threaded grooves and the first and second circulation channels,
    wherein a lateral side of the receiving space and the imaginary axis of the threaded shaft are skewed,
    wherein a lateral side of the circulation member and the imaginary axis of the threaded shaft are skewed, and
    wherein the predetermined included angle is an acute angel.

2. The internal circulation ball screw as defined in claim 1, wherein an imaginary first connection line is connected with a center of the first curved section and the imaginary axis; an imaginary second connection line is connected with a center of the second curved section and the imaginary axis; the imaginary first and second connection lines define the predetermined included angle therebetween.

3. The internal circulation ball screw as defined in claim 1, wherein the receiving space communicates with an end of the nut.

4. The internal circulation ball screw as defined in claim 1, wherein the receiving space communicates with the nut.

5. The internal circulation ball screw as defined in claim 1, wherein the first front section is as long as the second front section.

6. The internal circulation ball screw as defined in claim 5, wherein the first rear section is as long as the second rear section and the circulation member is elongated longitudinally.

7. The internal circulation ball screw as defined in claim 6, wherein a lateral side of the circulation member and the imaginary axis of the threaded shaft are arranged off-center.

8. The internal circulation ball screw as defined in claim 6, wherein the receiving space communicates with an end of the nut.

9. The internal circulation ball screw as defined in claim 6, wherein the receiving space runs through the nut.

\* \* \* \* \*